April 21, 1970  S. B. TUWINER  3,507,318
HEAT EXCHANGE APPARATUS
Filed Nov. 5, 1964  3 Sheets-Sheet 1

INVENTOR.
SIDNEY B. TUWINER
BY
Flynn Marm & Jangarathis
ATTORNEYS

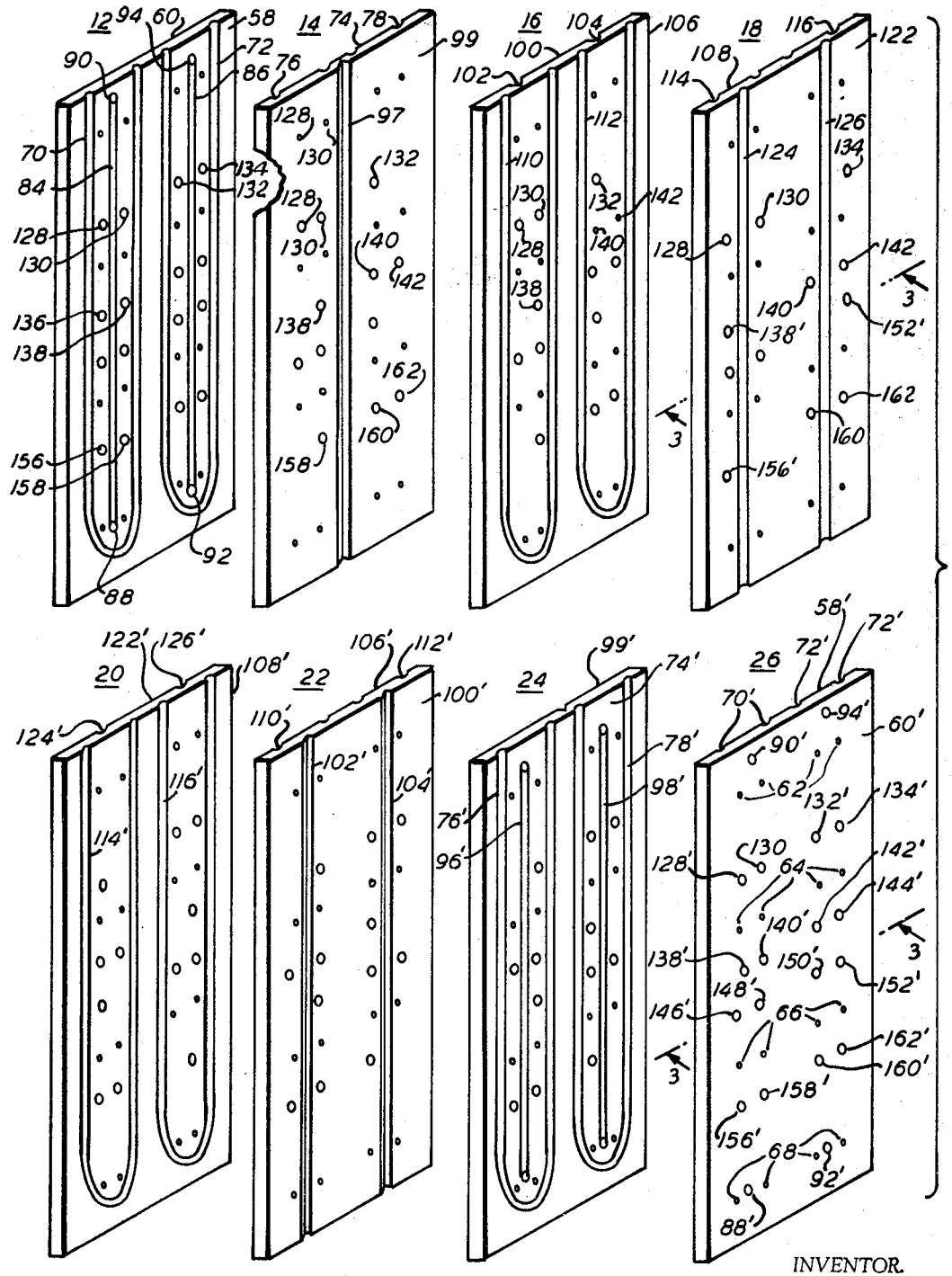
FIG. 2
INVENTOR.
SIDNEY B. TUWINER
BY
ATTORNEYS

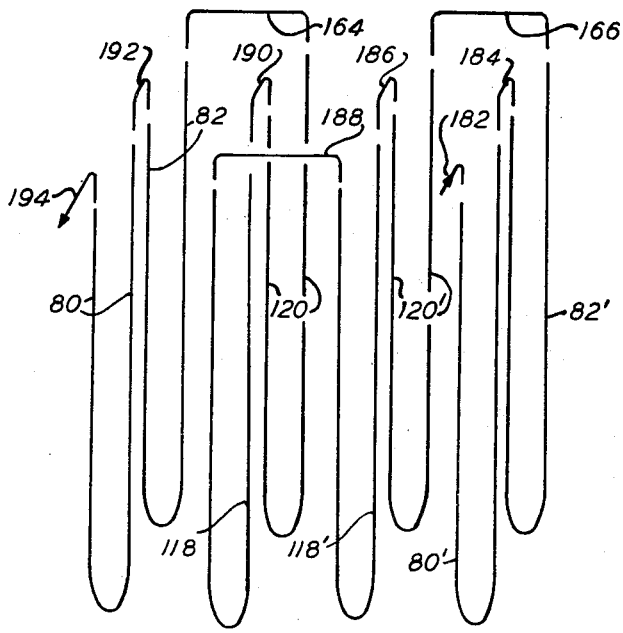
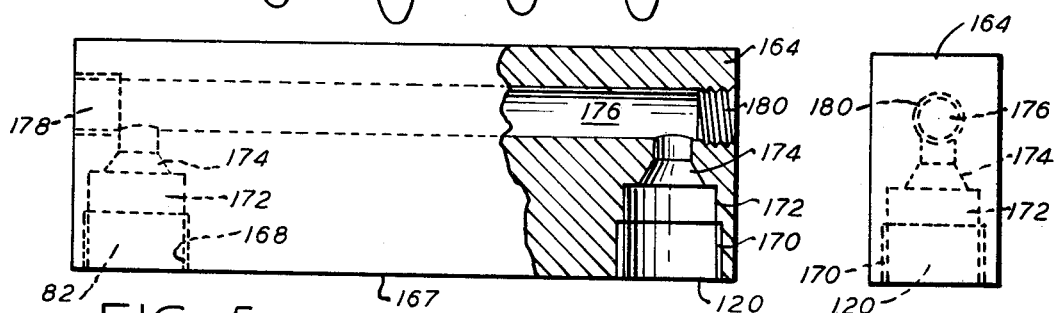
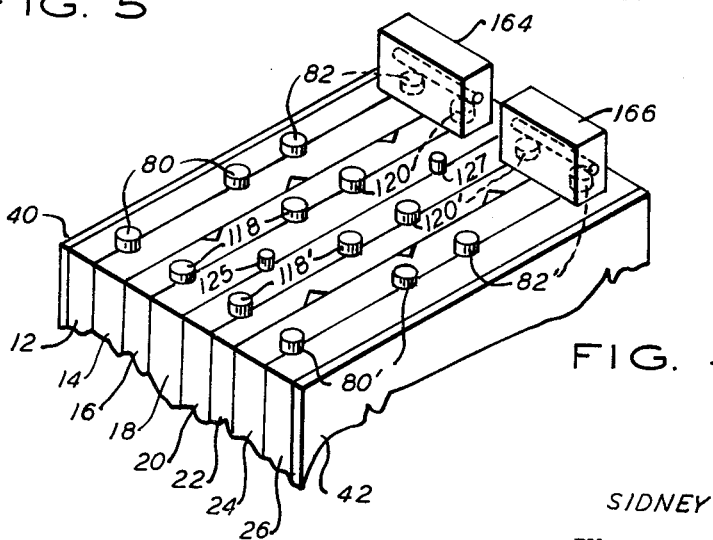

United States Patent Office 3,507,318
Patented Apr. 21, 1970

3,507,318
HEAT EXCHANGE APPARATUS
Sidney B. Tuwiner, Baldwin, N.Y., assignor to The Lummus Company, New York, N.Y., a corporation of Delaware
Filed Nov. 5, 1964, Ser. No. 409,148
Int. Cl. F28d 9/00
U.S. Cl. 165—1                                    24 Claims

ABSTRACT OF THE DISCLOSURE

A heat exchanger for maintaining pressure temperature conditions within a few degrees of a desired temperature formed from a plurality of mating heat conductive slabs. The slabs are provided with a plurality of recesses adapted to receive diverse conduits. One conduit is used to pass a process fluid while the other conduits are used to pass intermediate heat transfer fluids which permit close temperature control.

---

This invention relates generally to an improved reactor and, more particularly, to a reactor which is capable of maintaining the temperature of a process stream at every point of the stream to within a few degrees of a control point, despite the necessity of transferring considerable heat to the cold feed stream near the entrance point of the reactor, and also of transferring considerable exothermic heat from the process stream elsewhere in the reactor. The terms "reactor" or "heat exchanger" may both be applied to the invention, even though the net enthalpy change for the entire unit may be zero.

In numerous industrial processes, the yield and quality of the product are dependent on maintaining a temperature constant within a few degrees of an optimum throughout the reactor. As is well known, it is possible to design a reactor in which the exothermic heat is transferred so as to preheat the cold, entering feed. However, such reactors are subject to the limitation that the maintenance of a time-independent temperature is dependent on an exceedingly close control of the rate and composition of the feed stream. Moreover, the design of a reactor in which the temperature is space-independent throughout the reactor stream is impossible with shell-and-tube designs and other means used in the prior art.

To control exothermic reaction heat, the process stream flow must be such that heat is transferred from the stream through the boundary layer and a heat conductive wall to an absorbing medium, either another part of the process stream such as a cold feed stream, or a coolant. Endothermic heat must be supplied where required in the same fashion, from a heat source or a part of the process stream. Heretofore, only reactors employing a heat transfer fluid (molten salt, molten metal, etc.) for supplying or absorbing heat have been capable of maintaining a constant temperature throughout the process stream, and the agitation and circulation of hot and/or corrosive fluids necessary to maintain this temperature have posed severe mechanical problems.

It is therefore an object of this invention to overcome these limitations, and to provide a means for obtaining temperature equalization and control without the use of heat transfer fluid.

A further object of this invention is the provision of a new and improved reactor which is flexible so as to meet the maximum and minimum specifications of a process in both exothermic and endothermic reactions.

Various other objects and advantages of the present invention will become clear in the course of the following description of an embodiment of the invention, and the novel features will be particularly pointed out in connection with the appended claims.

In the present invention, the process stream is caused to flow inside of tubing or similar fluid conveying means, said tubing being enclosed within a block of heat conducting material such as copper, aluminum, graphite, etc. The tubing is constructed in multiple parallel runs interconnected with return bends, pipe or tube fittings or other means whereby the process stream is caused to reverse its direction, so that the portion of the stream in which exothermic heat is evolved comes into proximity with the heat absorbing portion of the process stream. By this means, a major part of the heat transfer is along a path which is lateral with respect to the direction of flow of the process stream. A lesser part of the heat flow is in a direction which is longitudinal with respect to the direction of the process stream. Heat transfer through this material is a consequence of a temperature difference between the heat source and the point of absorption, but if the mean path of heat flow is relatively short and the conductivity of the heat-conductive material is high, the temperature difference may be held to within any limits which may be specified. As the length of path of heat flow is less in the lateral direction than in the longitudinal when the parallel tubes are closely spaced, the advantage of transferring a major part of the heat laterally is apparent.

Heat flow from a heat source to the process stream or from the process stream to a coolant is also in a direction lateral to the direction of process stream flow. The heat source or coolant streams are thus arrayed along lines which are parallel with the process tubes and spaced between the multiple runs of the tubes.

According to the invention the heat conductive material of the reactor is constructed in longitudinal sections which are assembled and held in position by suitable clamps in such manner that all parts of the unit are held in firm, heat transfer contact. To this end, the heat conductive sections are longitudinally grooved so that sections of the grooves conform with sections of the tubes. Upon assembly of the heat conductive sections the tubes are held and enclosed by the heat conductive material.

Although reference is made in the foregoing to the incorporation of coolant transfer and heating means it is to be noted that one or the other or neither of these may be used, depending on whether there is an overall evolution of absorption of heat in the reaction under the temperature, pressure and flow conditions of the reaction. With a process involving exothermic reaction the heating means may be employed for startup only, after which the coolant may be used to remove heat to the extent required to maintain the temperature of the process stream, the flow of coolant being used as a means of temperature control.

For the purpose of illustrating the invention, there is shown in the drawings a form which is presently preferred; it being understood, however, that this invention is not limited to the precise arrangements and instrumentalities shown.

FIGURE 2 is an exploded view, in perspective, of the copper slabs utilized in manufacturing the heat exchanger of the present invention.

FIGURE 4 is a partial, perspective view of one end of the heat exchanger of the present invention, illustrating the process loop end caps in place.

FIGURE 5 is a front plan view partially broken away of one of the process loop end caps on FIGURE 4.

FIGURE 6 is a side plan view of the end cap of FIGURE 5.

FIGURE 7 is a diagrammatic illustration of the path of the process fluid through the heat exchanger of the present invention.

In the following description, the heat exchanger of the invention is described as positioned in accordance with the drawings, but it will be understood that orientation of the heat exchanger in any other position is possible and in some instances preferred.

Figure 1:
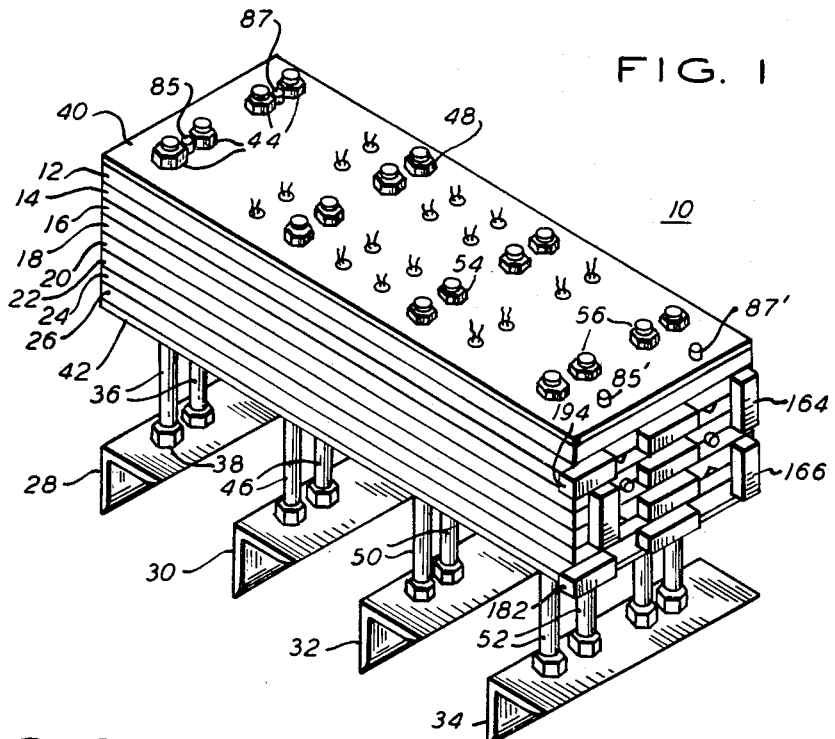
FIGURE 1 is a perspective view of the heat exchanger of the present invention in an assembled disposition.

In FIGURE 1, there is shown a perspective view of the heat exchanger or high temperature reactor of the present invention. The heat exchanger is generally designated by the numeral 10 and comprises eight machined copper slabs 12, 14, 16, 18, 20, 22, 24 and 26. The slabs 12–26 are bolted to four frames 28, 30, 32 and 34 by vertically extending bolts. Four vertically extending bolts 36, are fixedly secured to the frame 28 by nuts 38 on both sides of frame 28 (only upper nuts shown). The bolts 36 extend through aligned holes in the slabs 12–26 and sandwich the slabs 12–26 between upper and lower cover plates 40 and 42 by means of nuts 44. Nuts 44 are positioned above the upper plate 40 and below the lower plate 42 (lower nuts not shown) to press the slabs into intimate contact with one another.

Similarly, four vertical bolts 46, secure the heat exchanger 10 to frame member 30. The bolts 46 pass through the slabs 12–26 and the upper and lower cover plates 40 and 42 and are sandwiched in place by nuts 48 on either side.

Vertical bolts 50 and 52, which pass through the heat exchanger 10, are provided respectively for frame numbers 32 and 34 and are sandwiched and secured in place by nuts 54 and 56, respectively, in the same manner as nuts 44 and 48.

In FIGURE 2, there are shown the machined copper slabs 12–26 prior to assembly. The slab 12 is the mirror image of the slab 26. Thus, although only one side 58 of the slab 12 can be seen, it will be easily understood that the side 60' of slab 26 which can be seen in the FIGURE 2 showing is the mirror image of the side 60 of slab 12 which cannot be seen in the showing of FIGURE 2. Similarly, the side 58' of slab 26 which cannot be seen in the FIGURE 2 embodiment is the mirror image of the side 58 of slab 12.

The slabs 12–26 all have four spaced rows of bolt holes 62, 64, 66 and 68 for receiving the bolts 36, 46, 50 and 52 therethrough, which holes are identified on side 60' of slab 26.

The face 58 of slab 12 has two parallel U-shaped grooves 70 and 72 formed therein, said U-shaped grooves 70 and 72 being semi-circular in cross section. The next adjacent slab 14 has one side 74 in facing relation with side 58 of slab 12. Side 74 has two U-shaped grooves 76 and 78 disposed in the same manner on side 74 as grooves 70 and 72 are disposed on side 58. Grooves 76 and 78 are semi-circular in cross section so that when the slabs 12 and 14 are brought together grooves 70 and 76 form a U-shaped conduit which is circular in cross section. This U-shaped conduit is intended to receive a U-shaped process fluid tube 80 (FIGURE 4) whose outer diameter is equal to or slightly greater than the diameter of the U-shaped conduit formed by grooves 70 and 76 so that the tube 80 will be in intimate contact with the slabs 12 and 14. Similarly, U-shaped grooves 72 and 78 form a U-shaped conduit which is circular in cross section for receiving a second U-shaped process fluid tube 82 (FIGURE 4).

Slab 24 is the mirror image of slab 14 and therefore has one side 74' facing side 58' of slab 26. Sides 58' and 74' have U-shaped grooves 70', 72', 76' and 78' which operate in a manner similar to the grooves 70, 72, 76 and 78 discussed previously to provide support and positioning for two U-shaped process tubes 80' and 82' (FIGURE 4) sandwiched between slabs 24 and 26.

The slab 12 also has two vertically extending grooves 84 and 86 which are semi-circular in cross section and which extend from a point above the lowest portion of U-shaped grooves 70 and 72 to a point just below the upper edge of the slab 12. The U-shaped grooves 70, 72, 76, 78, 70', 72', 76', 78' all have their free ends extending to the upper edge of their respective slabs 12, 14, 26 and 24. At the ends of the grooves 84 and 86 there are drilled holes 88, 90, and 92, 94 which extend normal to the side 58 and through side 60 of slab 12. The intersection of the ends of grooves 84 and 86 and drilled holes 88, 90, 92, and 94 respectively are broken to receive copper tubes 85 and 87, described below.

Similarly, side 74 (not shown) has vertically extending grooves 96 and 98 (not shown) which cooperate with vertically extending grooves 84 and 86 to form a vertical passageway circular in cross section for receiving copper tubes 85 and 87 (FIGURE 3) for use by heat exchanger fluid intermediate the vertical legs of process tubes 80 and 82 respectively.

The slabs 24 and 26 also have vertically extending grooves 84', 86', 96', and 98', formed on respective surfaces 58', and 74'. The ends of the grooves 84' and 86' are defined by holes 88', 90', 92', and 94' which extend through side 60' so that a heat exchange fluid can be fed through the tubes 85' and 87' having their ends within holes 88', 90' and 92', 94'.

The slab 14 has a vertically extending triangular groove 97 extending the height thereof along the other side 99 opposite from side 74. A heater element (not shown), triangular in shape is intended to be placed in the groove 97 and forced into intimate contact with slabs 14 and 16 by the flat opposing side 100 of slab 16 when the assembly is secured. Side 100 of slab 16 also has two spaced parallel vertical grooves 102 and 104 similar to the groove 97 which extend the length of the slab 16 and are triangular in shape so as to receive a triangular heater element (not shown) which will be forced into intimate contact with the slab 16 by the slab 14.

The slab 24 also has a side 99' opposite from side 74' similar to the side 99 of slab 14 which includes a vertically extending machined triangular groove 97' for receiving a heater element to be held in place by the adjacent side 100' of slab 22. Slab 22 has two vertically machined triangular grooves 102' and 104' within which heater elements are placed for securement by the pressing together of slabs 22 and 24.

Thus, in total, the reactor of the present invention is intended to have six heaters triangular in cross section which will have a slightly greater cross sectional area than the machined grooves 97, 102, 104, 97', 102', and 104' so that there is intimate contact between the heaters and their respective slabs. It should be noted that these heaters are evenly spaced within the core of the reactor 10 so as to uniformly heat the reactor 10 and are also uniformly positioned between vertical legs of the closest U-shaped process tubes. Of course, as long as the latter requirements are met, other arrangements and/or types of heaters may be employed.

Slabs 16 and 18 have facing sides 106 and 108 on which are machined two sets of parallel U-shaped semi-circular grooves 110, 112, and 114, 116 similar in function to the U-shaped grooves 70, 72, and 76, 78 of slabs 12 and 14. The U-shaped grooves 110 and 114 receive a U-shaped process fluid tube 118 (FIGURE 4) and the U-shaped grooves 112 and 116 receive a U-shaped process tube 120 (FIGURE 4).

The slabs 22 and 20 also have opposed sides 106' and 108' with matching U-shaped grooves 110', 112' and 114', 116', respectively which are semi-circular in cross section so as to receive suitable U-shaped process tubes 118' and 120'.

The other sides 122 and 122' of slabs 18 and 20 respectively are in face to face relation. Each of these sides 122 and 122' has a pair of spaced parallel vertical grooves 124, 126 and 124', 126' respectively which are semicircular in cross section and which when forced together form conduits 124, 124' and 126, and 126' for heat exchange fluid. The latter conduits are positioned intermediate the adacent U-shaped process tubes, 118, 119' and 120, 120' respectively and receive tubes 125 and 127.

The heat exchanger 10 also has holes drilled therein for receiving thermocouples for measuring the temperature of the core at various points in order to determine the uniformity of the heat, so that suitable control of the heaters and the flow of coolant can be varied in accordance with the temperature of the core at any point.

At a first level below the top edge of slabs 12, 14, 16, 18, and 20, there are drilled four holes, 128, 130, 132, and 134. Hole 134 is drilled through slab 12 only. Hole 132 is drilled through slabs 12, 14, and 16 only. Hole 130 is drilled through slabs 12, 14, 16 and 18 only. Hole 128 is drilled through slabs 26, 24, 22, 20, and 18. This provides for a means of obtaining temperature gradients through one section of the assembled unit.

At a second level, holes 128', 130', 132', and 134' are drilled. Hole 128' is drilled through slab 26 only. Hole 130' is drilled through slabs 26, 24, and 22 only. Hole 132' is drilled through slabs 26, 24, 22, and 20 only. Hole 134' is drilled through slabs 26, 24, 22, 20, and 18. Thus, there is a reversal of depth penetration at a second section of the assembled unit. This provides for a means of obtaining temperature gradients at this section. Comparison of both temperature gradients before, during, and after operation of the unit indicates temperature uniformity of the assembly.

Figure 3:
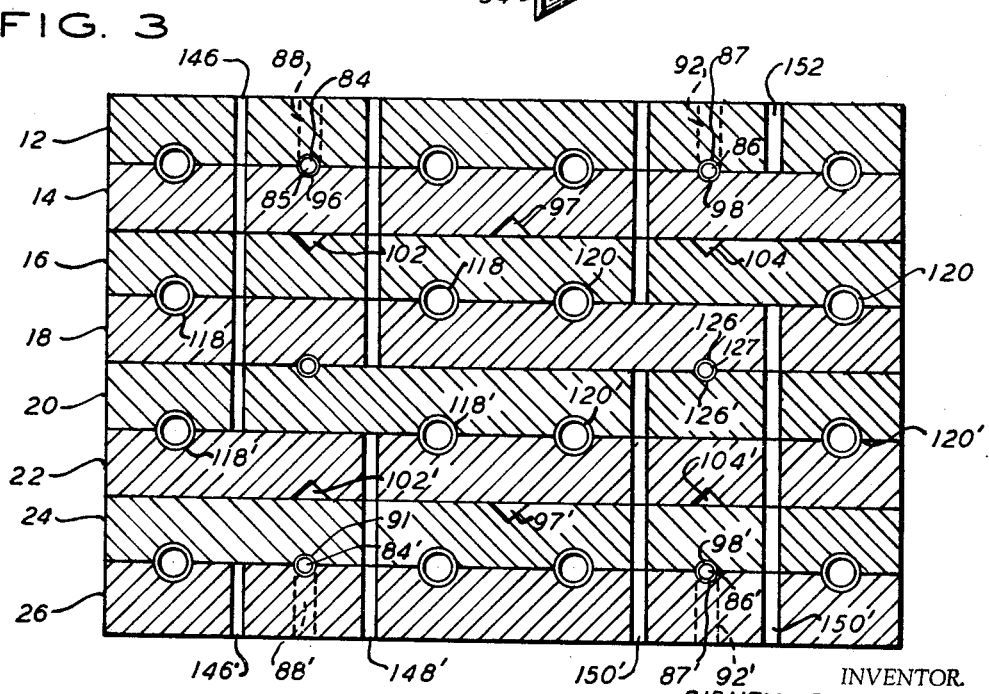
FIGURE 3 is a cross sectional view of the copper slabs utilized in the invention, after assembly, taken along lines 3—3 of FIGURE 2.

It will be understood that the levels of thermocouples discussed above are only for purpose of reference with respect to the showing in FIGURES 2 and 3. The core can be disposed at any angle, as has been shown in FIGURE 1. The only requirement is the the thermocouples be evenly distributed throughout the core so as to insure that no local hot spots occur which are not sensed by the thermocouples. In one particular embodiment of the present invention, pencil type thermocouples were utilized.

Below the aforementioned first level of holes, there are provided a second level of drilled holes 136, 138, 140, and 142, and below the second level a third level of drilled holes 156, 168, 160, and 162 in slabs 12, 14, 16, 18, and 20 as a means for obtaining the temperature gradients through a section as herein above described with reference to holes 128, 130, 132, and 134. Similar to the first level of holes 128', 130', 132', and 134' drilled through slabs 26, 24, 22, 20 and 18, there are provided a second, third, and fourth level of drilled holes 138', 140', 142', and 144'; 146', 148', 150' and 152'; and 156', 158', 160', and 162' respectively.

In FIGURES 4–6 there is shown one end of the core after assembly with two loop end caps 164 and 166 in place. There are in addition to end caps 164 and 166 five additional loop end caps exactly similar to loop end caps 164 and 166. However, for purposes of clarity, the position of these loop end caps has only been shown in the schematic drawing of FIGURE 7. The loop end cap 164 is intended to connect one free end of U-shaped process tube 82 to one free end of U-shaped process tube 120. Similarly, loop end cap 166 is intended to connect one free end of U-shaped tube 82' to one free end of U-shaped process tube 120'. Only loop end cap 164 will be discussed in detail, it being understood that all of the other loop end caps are substantially similar in structure and function.

Loop end cap 164 has a flat bottom face 167 into which are drilled two spaced cavities 168 and 170 at opposite ends thereof. The cavities 168 and 170 have a smaller diameter portion 172 within which is friction fitted the ends of process tubes 82 and 120. Above the restricted portion 172 there is provided a neck 174 for directing process fluid from the process tubes 82 and 120 into a horizontal passageway 176 drilled through loop end cap 164 from one side wall to the other. The horizontal passageway 176 is closed by a stopper 178 at one end thereof and by another stopper (not shown) at the other end thereof. The stopper which has not been shown is screw threaded into the end wall by reason of the threads 180 formed in the horizontal passageway 176 adjacent the ends thereof. It can thus be seen, that the loop end cap 164 provides a continuous passageway for process fluid from the free end of U-shaped process tube 82 to the free end of U-shaped process tube 120.

The other loop end caps associated with the other U-shaped process tubes will be discussed in an integrated explanation of the path of the process fluid as it passes through the heat exchanger 10 of the present invention in the manner shown in FIGURE 7. As shown in FIGURE 7, the process fluid enters one free end 182 of the process tube 80'; then through the other free end of process tube 80' to end cap 184 and into one free end of U-shaped process tube 82'. From the other free end of process tube 82' the fluid passes through the end cap 166 into one free end of U-shaped process tube 120'; then through process tube 120' into end cap 186; then through U-shaped process tube 118', end cap 188, U-shaped process tube 118, end cap 190, U-shaped process tube 120, end cap 164, U-shaped process tube 82, end cap 192, and through the final U-shaped process tube 80 to outlet 194. During this passage through the heat exchanger 10, the process fluid will have made sixteen passes from the time it entered inlet 182 till it left outlet 194.

In developing the heat exchanger 10, various possible transfer media were considered. As the result of considerable experimentation, it was found that it is preferrable to surround the process tubing with copper because of its high thermal conductivity. The thermal conductivity of copper is 218 B.t.u./(hr.) (sq. ft.) (° F./ft.), or almost twice that of aluminum. Moreover, the melting point of aluminum is 1220° F., only slightly above the maximum desired reactor temperature of 1112° F. Molten lead or other liquid transfer media require a considerable convective movement for high rates of heat transfer and may tend to stagnate in some stages. Furthermore, these media are subject to freezing at certain operating temperatures and the thermal conductivity of the solid media is low.

In the heat exchanger 10, the controlling heat transfer resistance is that of the tube side liquid film. As was stated previously, it is necessary that the feed entering the inlet conduit 12 be between 86° F. and 392° F. The heaters within the triangular grooves 97, 102, 104, 97', 102', 104' are designed to heat the material within the reactor to 752° to 1112° F. This requires a maximum net heat input of 9400 B.t.u./hr. at the highest reactor temperature and maximum flow rate.

From the standpoint of heat transfer, the critical region is at the inlet end of the reactor tubing. It is most desirable that the temperaure differential between the medium (the copper slabs 12–26) and the process fluid within the process tubes be less than 100° C. (180° F.). In the region of the inlet 182 and for some distance thereafter, it is obvious that the differential will be greater than that discussed above in the specifications. The heat transfer load is very high for the initial few feet. Heat transfer duty along the remainder of the process tube length will be relatively light and, because of the lower viscosity of the material of the process stream, heat transfer will be very efficient.

At ambient temperature, the material of the process stream may have a viscosity as high as 50 centipoises. This viscosity is reduced at the inlet temperature of the material of about 392° F. With a given fluid, it was found that the inlet viscosity was 10 centipoise and the flow rate was 10 lbs./hr. which gave a Reynolds number of 19.3, well within the region of streamline, or laminar, flow. Under these conditions, the heat transfer coefficient was between 3 to 12 B.t.u./(hr.) (sq. ft.) (° F.). As the fluid stream moves through the process tubes its temperature rises and its viscosity falls. When the viscosity has lowered to 0.1 centipoise, the flow becomes turbulent and the heat transfer coefficient rises to 40 B.t.u./(hr.) (sq. ft.) (° F.). The temperature of the material then approaches that of the core of the heat exchanger rapidly. If the temperature rise is sufficient to bring the viscosity to 0.01 centipoise, and the flow is approximately 20 lbs./hr., the tube side transfer coefficient may rise to 782 B.t.u./(hr.) (sq. ft.) (° F.). Even this high rate does not produce a situation in which the overall heat transfer coefficient is seriously effected by the resistance of the tube wall and the copper block.

It can thus be seen that the rate of heat transfer depends principally on the viscosity of the fluid at the temperature of the core of the heat exchanger. Further, it has been stated previously that the length of the reactor tube subject to entrance conditions cannot be very great. Assuming, for example, a mean heat transfer coefficient over the entrance region of 10 B.t.u./(hr.) (sq. ft.) (° F.), a core temperature of 1100° F. and a feed of 329° F., the fluid at 20 lbs./hr. flow will attain a temperature of 500° F. 4 or 5 feet from the entrance. At 500° F., the viscosity is reduced substantially and much higher coefficients of heat transfer obtain over the rest of the distance required to reach the final temperature. If a heat transfer coefficient of 200 is assumed, the fluid should attain 1000° F. in an additional run of one or two feet. In this determination, the effects of latent heat and of exothermic and endothermic heats of reaction have been neglected. Thus it can be seen that the fluid reached within 100° F. of the core temperature within a travel of about 7 feet from the entrance. Since, in the example cited, each of the U-shaped process tubes is approximately about 7 feet in length, it can be seen that the process fluid will reach the specification differential near the first U-shaped process tube 80'.

With cooling air flowing through the copper tubing, and assuming that there is only six feet of one half inch outer diameter copper tubing within the copper block, it would be possible to absorb 2000 B.t.u./hr., with the inlet at 50 p.s.i.g. and the outlet at atmospheric pressure. To absorb this heat, the air temperature must rise 153° F. and the log mean temperature difference between the block and air will be approximately 103° F. To provide less than 2000 B.t.u./hr. removal, it is only necessary to throttle the air supply to the copper tubing. In as much as the heat exchanger 10 provides for almost three times this air tube length, the heat exchanger is suitable for exothermic reaction applications wherein greater amounts of air cooling are necessary to remove 10,000 B.t.u./hr. at temperatures above 625° F. with good control. At lower temperatures, water cooling becomes necessary if this maximum exothermic heat is to be removed. Close control of temperature with water cooling is difficult. However, it can be obtained if the cooling medium enters the block at the end opposite to the process stream inlet in order to equalize the temperature gradients longitudinally.

The temperature differences within the copper slabs 12–26 due to the flow of heat from the electric heating elements to the process tubes would be quite small even under conditions of greatest heat demand. Problems of longitudinal gradients of temperature arise because the heaters deliver uniformly along their length, whereas the process tube would have, in general, a non-uniform load demand. The severity of this problem is greatly reduced by the fact that there are sixteen heat passes through the core of the heat exchanger. Even under the most severe conditions which can be foreseen, the maximum temperature difference within the block should be within 100° F.

It should be noted that the final solution to the problems discussed previously has taken advantage of the high thermal conductivity of the copper slabs with the intimate thermal contact between the copper and the electric heater provided by precisely machined grooves which literally squeeze the entire assembly together to insure close thermal contact between all components. The high thermal conductivity of the copper serves to keep the surface temperature of the electric heaters at a safe level. It also provides for the small temperature differential required in the specification.

Under certain conditions other metals, such as aluminum, might have weight and cost advantages over copper. However, the present invention has utilized the specific properties of copper to achieve a new and improved heat exchanger. Further, the unique mechanical design of the heat exchanger of the present invention which employs machined metal slabs instead of a cast or molten heat transfer bath has created a more flexible unit which is easily assembled and disassembled for replacement of defective heaters or fouled process tubes.

The present design also permits the use of straight-through process tubes instead of the U-shaped construction discussed above. It should be noted, however, that the U-shaped process tubes are far easier to clean than the helical or serpentine coils which have been utilized in cast heat exchangers or molten metal baths in the past.

The present invention may be embodied in other specific forms without departing from the spirit or essential attributes thereof and, accordingly, reference should be made to the appended claims rather than to the foregoing specification as indicating the scope of the invention.

What is claimed is:

1. A heat exchanger comprising:
   a plurality of mating, heat conductive slabs;
   a U-shaped groove, semi-circular in cross-section, on one surface of each of said slabs, said slabs being arranged so that said grooves form circular U-shaped passages when assembled;
   clamping means for pressing said slabs into face to face relation;
   a process fluid tube in each said U-shaped passage in intimate, heat conductive contact with said slabs;
   end cap means connecting said process fluid tubes each to the other in series relation to form a continuous process fluid tube;
   heating means for uniformly heating said slabs, said heating means being arranged generally parallel to the legs of said U-shaped passages;
   cooling means for uniformly cooling said slabs, said cooling means also being arranged generally parallel to the legs of said U-shaped passages; and
   means for supplying process fluid to one end of said continuous process fluid tube and withdrawing process fluid from the other end thereof.

2. The heat exchanger as claimed in claim 1, wherein said heating means are disposed in grooves on the side of said slabs opposite said U-shaped passages, said grooves being arranged in a pattern to provide uniform heating of said slabs.

3. The heat exchanger as claimed in claim 1, and additionally comprising a plurality of thermocouple means disposed within said slabs.

4. A heat exchanger comprising:
   a first heat conductive slab;
   a second heat conductive slab;
   means for securing said first and second heat conductive slabs in face to face relation;
   means mounted in said first and second slabs, at their interface, for carrying a process fluid; and
   means mounted in said first and second slabs, at their interface, for carrying a cooling fluid.

5. The heat exchanger as claimed in claim 4 and further comprising:

means, mounted in the face of said first slab opposite the slab interface, for uniformly heating said slabs.

6. The heat exchanger as claimed in claim 5 wherein said means for uniformly heating said slabs is a heating element mounted in grooves in said first slab.

7. The heat exchanger as claimed in claim 6 and further comprising:
temperature sensing means to sense the temperature at all points in said heat conductive slabs.

8. A heat exchanger comprising:
a plurality of mating, heat conductive slabs;
clamping means for securing said slabs in face to face relation;
means mounted in adjacent slabs, at first alternate interfaces, for carrying a process fluid; and
means mounted in said slabs, at second alternate interfaces for uniformly heating said slabs.

9. The heat exchanger as claimed in claim 8 wherein said means for carrying a process fluid is a tube mounted in intimate contact with grooves formed in said adjacent slabs.

10. The heat exchanger claimed in claim 9 wherein said process fluid carrying tube comprises a plurality of connected, spaced, parallel sections.

11. The heat exchanger claimed in claim 9 wherein said process fluid carrying tube is U-shaped and has free ends extending beyond said heat conductive slabs.

12. The heat exchanger claimed in claim 8 and further including means mounted in said adjacent slabs, at said first alternate interfaces, for carrying a cooling fluid.

13. The heat exchanger claimed in claim 12 wherein said means for carrying a cooling fluid is a tube mounted in intimate contact with grooves formed in said adjacent slabs.

14. The heat exchanger as claimed in claim 13 and further including temperature sensing means operative to sense the temperature at all points in said heat conductive slabs.

15. The heat exchanger claimed in claim 14 wherein said temperature sensing means includes holes through selected heat conductive slabs to receive temperature sensing elements at various depths within said heat conductive slabs.

16. A heat exchanger comprising:
a plurality of mating, heat conductive slabs;
clamping means for securing said slabs in face to face relation;
means mounted in adjacent slabs at their interfaces for carrying a process fluid; and
means mounted at the interfaces of said adjacent slabs for carrying a cooling fluid.

17. The heat exchanger claimed in claim 16 wherein said means for carrying a cooling fluid is a tube mounted in intimate contact with grooves formed in said adjacent slabs.

18. The heat exchanger claimed in claim 17 and further including temperature sensing means operative to sense the temperature at all points in said heat conductive slabs.

19. A heat exchanger comprising a plurality of offset tube coils, a plurality of block elements, each of said block elements being positioned adjacent and in direct heat-transfer contact with opposed portions of each of said tube coils, each of said tube coils having the entire outer surface of its major portion in direct heat-transfer contact with opposed block element portions, each of said block elements being in heat-transfer contact with at least one adjacent block element and means retaining all of said block elements in said direct heat-transfer contact relationship, whereby heat may be transferred from one to another of said tube coils through said block elements.

20. A temperature-transfer assembly including a plurality of tube coils, a plurality of block elements interspersed among said tube coils, means compressing said block elements into contact with said coils and with each other to form a substantially solid block, said block enclosing substantially the entirety of said coils whereby temperature may be transferred from one to another of said coils through said block.

21. A temperature-transfer assembly including a plurality of tube coils, a plurality of block elements interspersed among said tube coils, means compressing said block elements into contact with said coils and with each other to form a substantially solid block and to deform portions of said coils between said block elements.

22. The method of forming a heat exchanger which comprises the steps of positioning a plurality of tube coils having straight portions in parallel, spaced, offset relationship, enclosing said coil straight portions by placing a plurality of identical solid block elements among and about said coil portions, pressing said block elements together to form a substantially continuous solid block of heat-transfer material, to bring said block elements into mating, heat-transfer contact with each other and in heat-transfer contact with portions of said coils therebetween.

23. The method of forming a heat exchanger which comprises the steps of positioning a plurality of tube coils in parallel, spaced, offset relationship, placing a plurality of identical block elements among said coils, pressing said block elements together to form a substantially continuous solid block of heat-transfer material, to bring said block elements into mating, heat-transfer contact with each other and in heat-transfer contact with portions of said coils therebetween and to deform said coil portions.

24. The method of forming a heat exchanger which comprises the steps of positioning a plurality of tube coils in parallel, spaced, offset relationship, placing a plurality of identical block elements among said coils, pressing said block elements together to form a substantially continuous solid block of heat-transfer material, to bring said block elements into mating, heat-transfer contact with each other and in heat-transfer contact with portions of said coils therebetween and to deform said coil portions, and removably locking said block elements in said position.

References Cited

UNITED STATES PATENTS

| 2,160,928 | 6/1939 | Voorhees | 165—167 |
| 3,295,598 | 1/1967 | Metzer | 165—172 |
| 11,661 | 9/1854 | Carpenter | 165—175 |
| 1,670,127 | 5/1928 | Stancliffe | 165—165 |
| 1,571,068 | 1/1926 | Stancliffe | 165—165 |
| 1,955,261 | 4/1934 | Tryon et al. | 165—165 |
| 2,721,729 | 10/1955 | Van Riper | 165—64 |

FOREIGN PATENTS

| 1,213,890 | 4/1960 | France. |

ROBERT A. O'LEARY, Primary Examiner

C. SUKALO, Assistant Examiner

U.S. Cl. X.R.

165—172